United States Patent [19]

St. Clair et al.

[11] Patent Number: 5,420,202
[45] Date of Patent: May 30, 1995

[54] EPOXIDIZED LOW VISCOSITY RUBBER TOUGHENING MODIFIERS FOR CYCLOALIPHATIC EPOXY RESINS

[75] Inventors: David J. St. Clair, Houston; James R. Erickson, Katy, both of Tex.

[73] Assignee: Shell Oil Company, Houston, Tex.

[21] Appl. No.: 228,250

[22] Filed: Apr. 15, 1994

[51] Int. Cl.$^6$ .............. C08L 53/00; C08L 63/00; C08L 63/08
[52] U.S. Cl. ............... 525/92 H; 525/107; 525/113; 525/114; 525/95
[58] Field of Search .......... 525/92, 93, 314, 107, 525/113, 114

[56] References Cited

U.S. PATENT DOCUMENTS

| | | | |
|---|---|---|---|
| 4,237,245 | 12/1980 | Halasa et al. | 525/272 |
| 5,115,019 | 5/1992 | Marx et al. | 525/65 |
| 5,149,895 | 9/1992 | Coolbaugh et al. | 585/507 |
| 5,169,910 | 12/1992 | Corley | 525/481 |
| 5,191,024 | 3/1993 | Shibata et al. | 525/314 |
| 5,210,359 | 5/1993 | Coolbaugh et al. | 585/507 |
| 5,229,464 | 7/1993 | Erickson et al. | 525/314 |
| 5,247,026 | 8/1993 | Erickson et al. | 525/331.9 |
| 5,332,783 | 7/1994 | Dillman et al. | 525/92 |

FOREIGN PATENT DOCUMENTS

0396780A1 11/1989 European Pat. Off.
0441485A2 1/1991 European Pat. Off.

OTHER PUBLICATIONS

"Vinyl Ethers: Versatile Monomers for Coatings Applications," W. J. Burlant, J. S. Plotkin, F. J. Vara, International Specialty Products, RadTech Asia '91, Osaka, Japan, Apr. 1991.

*Primary Examiner*—James J. Seidleck
*Assistant Examiner*—Mark L. Warzel
*Attorney, Agent, or Firm*—Donald F. Haas

[57] ABSTRACT

The present invention provides a toughened cycloaliphatic epoxy resin composition comprising:
(a) a curable cycloaliphatic epoxy resin,
(b) an epoxidized low viscosity polydiene polymer wherein the polymer contains from 2.0 to 6.0 milliequivalents of epoxy per gram of polymer, and
(c) a curing agent.

34 Claims, No Drawings

EPOXIDIZED LOW VISCOSITY RUBBER TOUGHENING MODIFIERS FOR CYCLOALIPHATIC EPOXY RESINS

BACKGROUND OF THE INVENTION

This invention relates to blends of cycloaliphatic epoxy resins and epoxidized low viscosity polydiene polymers which are used for structural adhesives, coatings, electrical castings, encapsulants, potting compounds, laminates, and construction adhesives. More specifically, the invention relates to the use of epoxidized low viscosity polydiene polymers as toughening modifiers for cycloaliphatic epoxy resins.

Cycloaliphatic epoxy resins are generally known to be useful in a wide range of products such as filament-wound composites, as encapsulants for electrical products and in adhesives and coatings. Such resins include the Union Carbide Cycloaliphatic Epoxides and CYRACURE resins. Cycloaliphatic epoxy resins have the disadvantage that they are very brittle when cured. This brittleness makes them unsuitable for many applications including in coatings where brittleness leads to poor adhesion, in structural adhesives where brittleness causes poor impact resistance and in electrical encapsulants where brittleness leads to poor thermal shock resistance. Thus, it is clear that it would be advantageous if a way could be found to impart a degree of flexibility to these cycloaliphatic resins while retaining most, if not all, of their advantageous characteristics. The present invention provides this by blending the cycloaliphatic resins with specified low viscosity epoxidized polydienes.

Low viscosity epoxidized polydiene polymers are known to be useful in adhesives. Such polymers are described in commonly assigned U.S. Pat. No. 5,229,464. These polymers have a relatively high degree of flexibility and also a relatively high impact resistance. Compatible blends of the polymers of the above-described patent and aromatic epoxy resins are described in allowed copending commonly assigned application Ser. No. 08/090,856, filed Jul. 12, 1993, now U.S. Pat. No. 5,332,783. The epoxidized polydiene polymers impart a higher degree of flexibility to the aromatic epoxy resins when the two are blended together. The blends described in the afore-mentioned patent application have the disadvantage in that they are not sufficiently compatible at high concentrations of epoxidized polydiene polymer and also the toughness or impact resistance is good but could be improved upon.

SUMMARY OF THE INVENTION

This invention is a toughened cycloaliphatic epoxy resin composition containing an epoxidized low viscosity polydiene polymer. These low viscosity polymers are epoxidized copolymers of at least two conjugated dienes, preferably isoprene and butadiene. Preferred polymers for use in this invention are described in copending, commonly assigned, U.S. patent application Ser. No. 08/228,047, entitled "Epoxidized Low Viscosity Rubber," filed concurrently herewith, which is herein incorporated by reference. The copolymers may also contain up to 50% by weight, preferably 40%, of at least one vinyl aromatic hydrocarbon, preferably styrene. The monomers can be block or randomly copolymerized. The copolymers can be in the linear, radial, or star configuration.

The preferred epoxidized low viscosity polydiene polymer has the structural formula

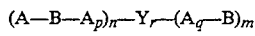

wherein Y is a coupling agent or coupling monomers or initiator, and wherein A and B are polymer blocks which may be homopolymer blocks of conjugated diolefin monomers, copolymer blocks of conjugated diolefin monomers, or copolymer blocks of diolefin monomers and monoalkenyl aromatic hydrocarbon monomers. Generally, it is preferred that the A blocks should have a greater concentration of more highly substituted aliphatic double bonds than the B blocks have. Thus, the A blocks have a greater concentration of di-, tri-, and tetra-substituted unsaturation sites (aliphatic double bonds) per unit of block mass than do the B blocks. This produces a polymer having the preferred structural formula wherein most facile epoxidation occurs in the exterior blocks—the A blocks (1,1-disubstituted, 1,2-disubstituted, 1,1,2-trisubstituted and 1,1,2,2-tetrasubstituted olefinic epoxides). In the above formula, the arms can also be B—A—B and B—A. The A blocks have a molecular weight of from 100 to 6,000, preferably 100 to 3000, most preferably 500 to 2000, and the B blocks have a molecular weight of from 1000 to 15,000, preferably 2000 to 10000, most preferably 3000 to 7000. n is greater than 0, r is 0 or 1, m is greater than or equal to 0, and n+m ranges from 1 to 100. p and q may be 0 or 1.

The epoxidized polymers have an epoxy content of from 2.0 to 6.0 milliequivalents of epoxy per gram of polymer (meq/g), preferably 3.5 to 5.0. For broadest utility, the polymers must contain some unsaturation. However, in certain suitably formulated compositions to be described below, hydrogenated polymers can be used. The low viscosity epoxidized polymers are used in an amount of from 1 to 50% by weight, preferably 5 to 20%. The cycloaliphatic epoxy resin composition also contains a curing agent. The overall molecular weight (peak, as determined by GPC) of the epoxidized polymer generally ranges from 1000 to 300,000, preferably 1000 to 100,000, and most preferably from 1000 to 20,000 and are preferably liquids.

DETAILED DESCRIPTION OF THE INVENTION

The invention composition includes a cycloaliphatic epoxy resin. The cycloaliphatie epoxy resin component of the composition can be any curable cycloaliphatie resin having, on the average, more than one epoxide group per molecule and may bear substituents which do not materially interfere with the curing reaction.

Suitable cycloaliphatie epoxy resins include those made by oxidation of cyclic polyolefins with a peracid, typically peracetic acid. The major suppliers of suitable cycloaliphatic epoxy resins are Union Carbide and Ciba Geigy. The resins are marketed by Union Carbide as Cycloaliphatic Epoxides and, more recently, under the trade name CYRACURE. Typical structures for these resins are given in Union Carbide brochures "Cycloaliphatic Epoxide Systems", 9/87, and "CYRACURE Cycloaliphatie Epoxides, Cationic UV Cure", 4/92. A particularly preferred cycloaliphatic epoxy resin is Union Carbide's ERL-4221, also sold as CYRACURE UVR-6110 (3,4-epoxycyclohexylmethyl-3,4-epoxycyclohexane carboxylate). This is also the most widely used cycloaliphatic epoxy resin in the industry today.

The epoxidized polydiene polymers of this invention have particularly good compatibility with CYRACURE UVR-6110, making them particularly good tougheners for this resin.

Other cycloaliphatic epoxy resins include those having glycidyl ether epoxide groups. Glycidyl ether epoxy resins are typically made by reaction of a diol or polyol with epichlorohydrin. A particularly preferred glycidyl ether epoxy resin is EPONEX 1510 from Shell Chemical, made by reaction of hydrogenated bis-phenol A with epichlorohydrin. Other examples of aliphatic glycidyl ether epoxy resins are those made by reaction of epichlorohydrin with low molecular weight alcohols such as 1,4-butane diol, 1,6-hexane diol and the like. Aromatic epoxy resins can also be used to replace a portion of the cycloaliphatic epoxy resin. However, the content of aromatic epoxy resins in the formulation is generally limited because they degrade the resistance of the composition to degradation by light so they may only form a minor portion of the total amount of epoxy resin. Monoepoxide resins can also be used at low levels as reactive diluents to reduce viscosity.

Polymers containing ethylenic unsaturation can be prepared by copolymerizing one or more olefins, particularly diolefins, by themselves or with one or more alkenyl aromatic hydrocarbon monomers. The copolymers may, of course, be random, tapered, block or a combination of these, as well as linear, star or radial.

The polymers containing ethylenic unsaturation or both aromatic and ethylenic unsaturation may be prepared using anionic initiators or polymerization catalysts. Such polymers may be prepared using bulk, solution or emulsion techniques. When polymerized to high molecular weight, the polymer containing at least ethylenic unsaturation will, generally, be recovered as a solid such as a crumb, a powder, a pellet or the like. When polymerized to low molecular weight, it may be recovered as a liquid such as in the present invention. Polymers containing ethylenic unsaturation and polymers containing both aromatic and ethylenic unsaturation are available commercially from several suppliers.

In general, when solution anionic techniques are used, copolymers of conjugated diolefins and alkenyl aromatic hydrocarbons are prepared by contacting the monomer or monomers to be polymerized simultaneously or sequentially with an anionic polymerization initiator such as group IA metals, their alkyls, amides, silanolates, napthalides, biphenyls or anthracenyl derivatives. It is preferred to use an organo alkali metal (such as sodium or potassium) compound in a suitable solvent at a temperature within the range from about $-150°$ C. to about 300° C., preferably at a temperature within the range from about 0° C. to about 100° C. Particularly effective anionic polymerization initiators are organo lithium compounds having the general formula:

$RLi_n$ wherein R is an aliphatic, cycloaliphatic, aromatic or alkyl-substituted aromatic hydrocarbon radical having from 1 to about 20 carbon atoms and n is an integer of 1 to 4.

Conjugated diolefins which may be polymerized anionically include those conjugated diolefins containing from about 4 to about 24 carbon atoms such as 1,3-butadiene, isoprene, piperylene, methylpentadiene, phenyl-butadiene, 3,4-dimethyl-1,3-hexadiene, 4,5-diethyl-1,3-octadiene and the like. Isoprene and butadiene are the preferred conjugated diene monomers for use in the present invention because of their low cost and ready availability. Alkenyl (vinyl) aromatic hydrocarbons which may be copolymerized include vinyl aryl compounds such as styrene, various alkyl-substituted styrenes, alkoxy-substituted styrenes, vinyl napthalene, alkyl-substituted vinyl napthalenes and the like.

The epoxidized low viscosity polymers of the present invention have the general formula

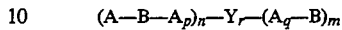

$(A-B-A_p)_n-Y_r-(A_q-B)_m$ wherein Y is a coupling agent or coupling monomers or initiator, and wherein A and B are polymer blocks which may be homopolymer block of conjugated diolefin monomers, copolymer blocks of conjugated diolefin monomers, or copolymer blocks of diolefin monomers and monoalkenyl aromatic hydrocarbon monomers. Polymers of this type are described in more detail in U.S. Pat. No. 5,229,464 which is herein incorporated by reference. Generally, it is preferred that the A blocks should have a greater concentration of more highly substituted aliphatic double bonds than the B blocks have. Thus, the A blocks have a greater concentration of di-, tri-, and tetra-substituted unsaturation sites (aliphatic double bonds) per unit of block mass than do the B blocks. This produces a polymer wherein the most facile epoxidation occurs in the exterior blocks—the A blocks (1,1-disubstituted, 1,2-disubstituted, 1,1,2-trisubstituted and 1,1,2,2-tetrasubstituted olefinic epoxides). The A blocks have a molecular weight of from 100 to 6,000 and the B blocks have a molecular weight of from 1000 to 15,000. n is greater than 0, r is 0 or 1, m is greater than or equal to 0, and n+m ranges from 1 to 100. p and q may be 0 or 1.

Useful randomly epoxidized star polymers are described in U.S. Pat. No. 5,247,026 which is herein incorporated by reference. That patent describes randomly epoxidized star polymers, based on at least one conjugated diolefin monomer, that contain di-, hi- and/or tetrasubstituted olefinic epoxides. The star polymers have greater than four arms or branches. Each arm has a molecular weight from 1500 to 15,000 and contains the concentration of di-, tri-, or tetrasubstituted olefinic epoxides (1,1-disubstituted, 1,2-disubstituted, 1,1,2-disubstituted and 1,1,2,2-tetrasubstituted olefinic epoxides) described below.

Polyisoprene homopolymers which have been epoxidized to the required extent may also be useful in toughening cycloaliphatic epoxy resins. Such polymers must be low viscosity and low molecular weight—the molecular weight should be in the range from about 500 to about 20,000. These polymers, as all of the polymers described herein, may contain some amount of a vinyl aromatic hydrocarbon, preferably styrene, as described below.

When the concentration of alkenyl aromatic in the epoxidized polymer is less than or equal to 5% by weight, the concentration of epoxide may range from 3 to 6 meq/g of polymer. When the A block is a block composed primarily of randomly copolymerized isoprene and styrene and the concentration of alkenyl aromatic hydrocarbon monomer is from about 5% to 20% by weight, the concentration of epoxide may range from 2 to 6 meq/g of polymer. When the B block is a block composed primarily of randomly epoxidized butadiene and styrene and the concentration of monoalkenyl aromatic hydrocarbon is from about 5% to 50% by weight, the concentration of epoxide may again range from 2 to 6 meq/g of polymer. These polymer compositions are for non-hydrogenated, unsaturated polymers. Hydrogenation of these polymers tends to reduce the compatibility of the epoxidized polymers with cycloaliphatic resins. However, in certain suitably formulated compositions, hydrogenated polymers can be used.

It has been found that by the proper combination of unsaturation, epoxide level, and alkenyl aromatic monomer content, a low viscosity polydiene which possesses suitable compatibility with cycloaliphatic epoxy resins to yield an improved balance of properties can be made. The presence of epoxidation and unsaturation is required in the low viscosity polymers to achieve the broadest compatibility of the polymers with cycloaliphatic resins. Therefore, in most cases, the majority of the diene mers remain unsaturated before epoxidation in the preferred polymers. When alkenyl aromatic monomers are present at concentrations of less than 5% by weight, the preferred epoxide level ranges from 3 to 6 meq/g of polymer. When alkenyl aromatic monomers are incorporated at levels of 5% by weight or greater in the largely unsaturated polydiene block copolymer, its compatibility with cycloaliphatic epoxy resin is improved to such a degree that lower levels of epoxidation will yield improved rubber modified cycloaliphatic epoxy resins. Thus, when alkenyl aromatic monomers are present at concentrations of 5% by weight or greater, the preferred epoxide level ranges from 2 to 6 meq/g of polymer.

The preferred epoxy concentration for all of these polymers is from 3.5 to 5.0 meq/g. If the epoxy concentration is less than about 3.5, compatible blends of the polymer with the resin are more difficult to obtain. If the epoxy concentration is greater than about 5.0, the performance benefit obtained is not justified by the increased cost of the polymer. The goal is to achieve a composition which is on the edge of compatibility and incompatibility and each cycloaliphatic epoxy resin formulation may have its own particular epoxidized polydiene polymer that works best in this regard. The epoxy level, degree of unsaturation, and styrene content of the preferred polymers of this invention are specified herein to achieve such a degree of compatibility with cycloaliphatic epoxy resins.

It has been found that hydrogenated versions of these epoxidized polymers, even those which are only partially hydrogenated, are highly incompatible with cycloaliphatic epoxy resins. These polymers can be used to produce excellent toughened cycloaliphatie epoxy resin compositions if another major ingredient is incorporated into the composition at a level of at least 20 percent by weight. It is preferred that no more than about 80 percent by weight of this component be added to the composition because the curing agents such as the cationic photoinitiator, UVR-6974, become insoluble in the formulation. This third component is a vinyl ether. Vinyl ethers are particularly well suited for use in combination with cycloaliphatic epoxy resins because vinyl ethers can also be cured via a cationic cure mechanism which is frequently used to cure cycloaliphatic epoxy resin compositions. In compatibility screening studies of the commercially available vinyl ethers, one vinyl ether stood out as having particularly good compatibility with one of the epoxidized hydrogenated polymers (Polymer M of Example 3). This vinyl ether was RAPI-CURE CHVE, cyclohexane dimethanol divinyl ether, from ISP, Inc. Judging from the structures of the other commercially available vinyl ethers, it is likely that RAPI-CURE CHVE will also be the most effective for compatibilizing the other epoxidized polymers and cycloaliphatic resins of this invention.

In another embodiment of this invention, a blend of an epoxidized polydiene polymer used as a toughness modifier and a low molecular weight epoxy functional diluent used as a viscosity reducer is employed as a modifier for cycloaliphatic epoxy resins. These diluents include epoxidized oils, such as epoxidized soybean oil and epoxidized castor oil, naturally occurring epoxidized oils, such as vernonia oil, epoxidized olefins, such as vinyl cyclohexene monoxide, and glycidyl ether epoxides such as butyl glycidyl ether, phenyl glycidyl ether and the like. The appropriate ratio of epoxidized polydiene polymer to epoxidized diluent must be determined for each particular application. However, typically, the weight ratio of epoxidized polymer to epoxidized diluent should range from 100/1 to about 1/1.

When cured, cycloaliphatic epoxy resin matrices are typically very brittle. One way to reduce brittleness is to incorporate a relatively low modulus second phase in the cycloaliphatic epoxy resin matrix. This second phase acts to build in sites of stress concentration where local deformation can occur rather than catastrophic bulk deformation (brittle fracture). Also, this second phase can act to blunt or terminate growing cracks and it can absorb energy by deformation and cavitation.

Another way to reduce brittleness is to incorporate a flexible additive (diluent) molecularly into the covalent resin network. This second approach will reduce brittleness but will also reduce the rigidity of the matrix more than the first approach.

The exact method by which the epoxidized polydiene polymers toughen cycloaliphatie epoxy resins is not known. However, the composition of the epoxidized polydiene polymer will probably determine the mechanism. Polymers based on isoprene and butadiene epoxidized to only about 3 meq/gm have marginal compatibility in the cycloaliphatic epoxy resin and so, when cured, they probably toughen by the first approach. When epoxidized at about 6 meq/gm, they become soluble in the cycloaliphatie epoxy resin and so, when cured, they probably toughen by the second approach. When styrene is incorporated into the polymers, the level of epoxidation necessary to obtain at least marginal compatibility drops to about 2 meq/gm. At this level, the epoxidized polymers probably toughen by the first approach. When epoxidized to up to about 5 meq/gm, they become soluble in the cycloaliphatic epoxy resin and probably toughen by the second approach.

The epoxidized rubber modified cycloaliphatie epoxy resins can be cured by a variety of means. Anhydride curing agents are commonly used. Such anhydride curing agents may be generally described as any compound containing one or more anhydride functional groups. Most commonly used anhydrides have an aromatic, cycloaliphatic or aliphatic structure. The curing agent may be selected from the group consisting of phthalic anhydride, substituted phthalic anhydrides, hydrophthalic anhydrides, substituted hydrophthalic anhydrides, succinic anhydride, substituted succinic anhydrides, halogenated anhydrides, multifunctional carboxylic acids, and polycarboxylic acids. Examples include phthalic anhydride (PA), tetrahydrophthalic anhydride (THPA), nadic methyl anhydride (NMA), hexahydrophthalic anhydride (HHPA), pyromellitic dianhydride (PMDA), methyltetrahydrophthalic anhydride (MTHPA), and dodecenylsuccinic anhydride (DSA), and the like. In addition, multifunctional carboxylic acids will provide similar performance. The anhydride is combined with the modified cycloaliphatic epoxy resins such that a suitable anhydride/epoxide molar ratio is achieved. This ratio should range from 0.8/1 to 1.2/1 to achieve suitably complete cycloaliphatic epoxy network formation. Usually, the best properties are found at the highest crosslink density, which occurs at 1/1 anhydride/epoxy molar ratio. Typically, the anhydride cures are conducted at elevated temperatures, 100° to 170° C. for a period of 30 minutes to 6 hours, and are often referred to as "bake cures." The anhydride bake cures can be accelerated by using a curing accelerator. Suitable curing accelerators include trialkyl amines, hydroxyl-containing compounds and imidazoles. Benzyldimethylamine (BDMA) and ethylmethylimidazole have been found to work well in curing the blends of the present invention.

Another common method to cure cycloaliphatic epoxide groups is via a catalytic, ring-opening, homopolymerization to generate ether linkages between molecules. Typical catalysts are Lewis acids, such as boron triflouride, and protic acids, including phosphoric acid and sulfonic acids such as trifluoromethanesulfonic acid. These acids will cure cycloaliphatic epoxy resins very quickly at ambient temperatures. Amine blocked versions of these acids are also useful. Therefore, the resin and catalyst must be used as a two-component product in which the two components are mixed immediately before application and must be applied before the mixture gels. These acids are also available in the salt form using volatile bases to block the epoxy curing reaction. These blocked catalysts can be mixed with the epoxy resin, since no reaction occurs at ambient temperatures, giving a one-component product. After application, the formulation is baked, releasing the blocking agent to regenerate the acid which initiates cure of the epoxide groups. Another type of blocked catalytic curing agent, which is commercially available from Union Carbide as CYRACURE UVI-6974, is an aryl sulfonium salt which, when exposed to ultraviolet radiation, generates a cation which can initiate cure of the epoxide groups. This cationic photoinitiator can be blended with the cycloaliphatic epoxy resin in a one-component product which, after application, can be exposed to UV radiation to initiate cure.

The blends of the present invention may be used in any of the applications in which cycloaliphatic epoxy resins are presently used. Typical applications are structural adhesives, coatings, composites and electrical encapsulants. The compositions of the present invention are useful in adhesives (including contact adhesives, laminating adhesives, assembly adhesives, and structural adhesives), in sealants, potting compounds, coatings such as topcoats for automotive, inks (as replacements for resins such as rosin, hydrocarbon and alkyds, as modifiers for cationic curing U.V. screen inks, litho and flexo inks), and molded thermoset parts. The blends of the present invention should be more flexible, have higher toughness and have better thermal shock resistance when used in a structural adhesive, coating, composite or encapsulant than products using cycloaliphatic epoxy resins alone.

A wide variety of fillers can be used in formulations within the present invention. Suitable fillers include calcium carbonate, clays, talcs, zinc oxide, titanium dioxide silica and the like. The amount of filler usually is in the range of 0 to about 65% by weight of the formulation depending on the type of filler used and the application for which the formulation is intended. Preferred fillers are silica and titanium dioxide.

Stabilizers known in the art may also be incorporated into the composition. These may be for protection during the life of the article against, for example, oxygen, ozone and ultra-violet radiation. These may also be for stabilization against thermo-oxidative degradation during elevated temperature processing. Antioxidants which interfere with the curing reaction should be avoided.

Molecular weights of linear polymers or unassembled linear segments of polymers such as mono-, di-, triblock polymers, arms of star polymers before coupling, etc. are conveniently measured by Gel Permeation Chromatography (GPC), where the GPC system has been appropriately calibrated. For polymers of the type described herein, the appropriate standard is a narrow molecular weight distribution polystyrene standard. For anionically polymerized linear polymers, the polymer is essentially monodisperse and it is both convenient and adequately descriptive to report the "peak" molecular weight of the narrow molecular weight distribution observed. The peak molecular weight is usually the molecular weight of the main species shown on the chromatograph. For materials to be used in the columns of the GPC, styrene-divinyl benzene gels or silica gels are commonly used and are excellent materials. Tetrahydrofuran is an excellent solvent for polymers of the type described herein. Ultraviolet or refractive index detectors may be used.

Measurement of the true molecular weight of a coupled star polymer is not as straightforward or as easy to make using GPC. This is because the star shaped molecules do not separate and elute through the packed GPC columns in the same manner as do the linear polymers used for the calibration. Hence, the time of arrival at an ultraviolet or refractive index detector is not a good indicator of the molecular weight. A good method to use for a star polymer is to measure the weight average molecular weight by light scattering techniques. The sample is dissolved in a suitable solvent at a concentration less than 1.0 gram of sample per 100 milliliters of solvent and filtered using a syringe and porous membrane filters of less than 0.5 microns pore size directly into the light scattering cell. The light scattering measurements are performed as a function of scattering angle, polymer concentration and polymer size using standard procedures. The differential refractive index (DRI) of the sample is measured at the same wavelength and in the same solvent used for the light scattering. The following references are herein incorporated by reference:

1. *Modern Size-Exclusion Liquid Chromatography*, M. W. Yau, J. J. Kirkland, D. D. Bly, John Wiley and Sons, New York, New York, 1979.
2. *Light Scattering From Polymer Solutions*, M. B. Huglin, ed., Academic Press, New York, New York, 1972.
3. W. K. Kai and A. J. Havlik, *Applied Optics*, 12, 541 (1973).
4. M. L. McConnell, *American Laboratory*, 63, May, 1978.

If desired, these block copolymers can be partially hydrogenated. Hydrogenation may be effected selectively as disclosed in U.S. Pat. Re. No. 27,145 which is herein incorporated by reference. The hydrogenation of these polymers and copolymers may be carried out by a variety of well established processes including hydrogenation in the presence of such catalysts as Raney Nickel, nobel metals such as platinum and the like, soluble transition metal catalysts and titanium catalysts as in U.S. Pat. No. 5,039,755 which is also incorporated by reference. The polymers may have different diene blocks and these diene blocks may be selectively hydrogenated as described in U.S. Pat. No. 5,229,464 which is also herein incorporated by reference.

The toughened cycloaliphatic epoxy resin compositions of this invention may be used in a variety of applications. They have special utility in structural adhesives and coatings where they may be combined with anhydride curing agents or catalytic curing agents to form excellent, impact resistant products. They have special utility in coatings, where they may be combined with a cationic photoinitiator and, after application to a substrate, can be cured by exposure to UV radiation to form excellent, flexible products. Other applications for these compositions include electrical castings, encapsulants, potting compounds, laminates, and construction adhesives.

EXAMPLE 1

One important application of these epoxidized-rubber modified cycloaliphatic epoxy resin compositions is in coatings, especially coatings crosslinked via a UV initiated cationic cure reaction. The formulation used for the following experiments comprised 78.9% by weight of the cycloaliphatic epoxy resin, CYRACURE UVR-6110, 3,4-epoxycyclohexylmethyl-3,4-epoxycyclohexane carboxylate from Union Carbide, 20% of the epoxidized rubber, 1% of the cationic photoinitiator, CYRACURE UVI-6974, mixed triarylsulfonium hexafluoroantimonate salts from Union Carbide, and 0.1% of a wetting agent, FLUORAD FC-430, a nonionic fluorochemical surfactant from 3M, which is used to reduce the surface tension of the coating and improve its ability to wet the aluminum substrate onto which it will be coated. The components were mixed manually at about 100° C. The blends were first checked for phase stability by inspecting them visually after they had stood undisturbed in a bottle overnight. If they were phase stable, they were warmed to about 70° C. and applied to aluminum substrates with a #40 wire rod at a dry film thickness of about 1 rail. The coatings were cured by exposure to UV radiation from 1 medium pressure Hg lamp at a line speed of 30 feet per minute (fpm). The coatings were then baked for 10 minutes at 120° C. to complete the cure.

The films were evaluated for mechanical properties. The appearance of the coatings was judged visually. The pencil hardness (gouge) of the coatings was measured according to the ASTM D3363 method of pushing successively softer pencil leads across the coating until the pencil lead will no longer gouge through the coating. The hardness scale (softest to hardest) is 6B<5B<4B<3B<2B<B<HB<F<H<2H<3H<4H<5H<6H. The methyl ethyl ketone (MEK) resistance of the coatings was measured according to the ASTM D4752 method of rubbing an MEK-moistened cloth across the coating for 200 cycles, or until breakthrough to the aluminum substrate occurred (one cycle equals one forward and one backward stroke). The value given in the table is the number of cycles the coating survived before breakthrough. Adhesion of the coatings was measured with the cross hatch adhesion test, ASTMD3359, Method B. In this test, a lattice pattern is scribed through the coating, pressure sensitive tape is applied and removed, and the amount of coating removed with the tape is rated. The scale ranges from 5 (no adhesion loss) to 0 (greater than 65% adhesion loss). The flexibility of the coatings was measured with the mandrel bend test according to ASTM D522, Method A. In this test, the coated 4-inch wide, 25 mil thick panel is bent around a standard conical mandrel and the percentage of the distance across the panel through which the coating cracks is measured (0% is no cracking, 100% is cracking of the coating completely across the panel). In some cases, flexibility was also judged by the wedge bend test. In this test, the coating on a 10 mil thick, 3 inch wide steel panel is bent with a wedge shaped die which varies the severity of the bend across the panel. On one edge, the panel is bent back upon itself. The wedge shaped die progressively reduces the severity of the bend across the panel until, on the other edge of the panel, the bend simulates that of a 0.1 inch diameter mandrel. The result is given as the percentage of the width of the panel across which the coating cracks. The polymers used to flexibilize the coatings are described in Table I. The results of coating evaluations are shown in Table II.

TABLE I

| | Composition of Epoxidized Polymers | | | |
|---|---|---|---|---|
| Identity | Base Polymer Architecture | Molecular Weights (in thousands) | Styrene Content (%) | Epoxy Level (meq/g) |
| A | I-B | 0.88–4.08 | 0 | 2.1 |
| B | I-B | 0.88–4.08 | 0 | 3.6 |
| C | I-B | 0.88–4.08 | 0 | 5.2 |
| D | I/S-B-I/S | 1.18/0.68–3.82–0.68/0.39 | 16 | 0.8 |
| E | I/S-B-I/S | 1.18/0.68–3.82–0.68/0.39 | 16 | 2.2 |
| F | I/S-B-I/S | 1.18/0.68–3.82–0.68/0.39 | 16 | 3.4 |
| G | I-S/B-I | 1.0–2.5/1.5–1.0 | 39 | 2.2 |
| H | I-S/B | 1.18/0.68–3.82 | 12 | 3.5 |
| I | I/S-B | 1.18/0.68–3.82 | 12 | 4.5 |
| J | I/S-B | 1.18/0.68–3.82 | 12 | 5.5 |
| K | (I-B)$_4$ | (0.9–4.5)$_4$ | 0 | 2.0 |
| L | (I-B)$_4$ | (0.9–4.5)$_4$ | 0 | 3.85 |

In the base polymer architecture column of Table I, B represents polybutadiene block, I represents polyisoprene blocks, and S represents polystyrene blocks, respectively. Homopolymer blocks are separated by a dash. Random copolymer blocks are represented by I/S and S/B for randomly copolymerized isoprene and styrene and randomly copolymerized styrene and butadiene, respectively. Star or radial polymers having n arms are represented in parentheses, ( )$_n$. In all polymers the polybutadiene microstructure is 45% 1,2-addition.

TABLE II

| | Compatibility and Cure of Polymer/Cycloaliphatic Epoxy Blends | | | | | | | |
|---|---|---|---|---|---|---|---|---|
| Polymer | Epoxy Content (meq/g) | Compatible ? | Thickness (mil) | Hardness | MEK Rubs | Cross-hatch Adhesion | Mandrel Bend (%) | Appearance |
| A | 2.1 | No | — | — | — | — | — | Bad |
| B | 3.6 | YES | 1 | HB | >200 | 0 | 69 | Nice |

TABLE II-continued

Compatibility and Cure of Polymer/Cycloaliphatic Epoxy Blends

| Polymer | Epoxy Content (meq/g) | Compatible? | Thickness (mil) | Hardness | MEK Rubs | Cross-hatch Adhesion | Mandrel Bend (%) | Appearance |
|---|---|---|---|---|---|---|---|---|
| C | 5.2 | Yes | 0.6 | H | >200 | 0 | 87 | Nice |
| D | 0.8 | No | — | — | — | — | — | Bad |
| E | 2.2 | Yes | 2.2 | H | >200 | 0 | 100 | Nice |
| F | 3.4 | Yes | 2.1 | H | >200 | 0 | 100 | Nice |
| G | 2.2 | Yes | 0.9 | HB | >200 | 5 | 0 | Nice |
| H | 3.5 | Yes | 0.4 | HB | >200 | 0 | 6 | Nice |
| I | 4.5 | Yes | 0.7 | HB | 154 | 0 | 0 | Nice |
| J | 5.5 | Yes | 1.1 | HB | >200 | 0 | 69 | Nice |
| K | 2 | No | — | — | — | — | — | — |
| L | 3.85 | Yes | 0.9 | HB | >200 | 0 | 0 | Nice |

The results show generally that the styrene-containing polymers can be made compatible with the epoxy resin by incorporating at least 2.0 meq/g of epoxy into the polymer. The polymers that do not contain styrene require at least 3.0 meq/g of epoxy to be compatible.

EXAMPLE 2

Polymer G from Example 1 was hydrogenated before epoxidation such that the B block was completely hydrogenated and the I blocks retained some unsaturation. The polymer was epoxidized to epoxy contents of 1.2, 1.3, and 1.9 meq/g. None of these polymers proved to be compatible in the formulation of Example 1.

Polymer D was hydrogenated in the same manner as described in the previous paragraph and epoxidized to an epoxy content of 3.0 meq/g. When evaluated in the formulation of Example 1, the polymer was incompatible. These experiments lead to the conclusion that hydrogenated polymers are less compatible than unsaturated polymers at the same epoxy content and that epoxidation to levels greater than 3.0 meq/gm would be required to make hydrogenated polymers which are compatible with cycloaliphatic epoxy resins.

EXAMPLE 3

Polymer M was made by anionic polymerization with sec-butyl lithium, selective hydrogenation with nickel/aluminum, and epoxidation with peracetic acid. The polymer can be described as an epoxidized I-S/EB-I linear sequentially polymerized polymer, where I represents a 1000 MW block of polyisoprene and S/EB represents a hydrogenated, 4000 MW random styrene/butadiene (2500 MW S/1500 MW B) block. The partially hydrogenated polyisoprene endblocks are epoxidized to give 1.2 milliequivalent of epoxy per gram of polymer (about 7 epoxide groups per molecule, about 3 or 4 on each end of the S/EB block). The predominant functional group is the epoxidized 1,4-isoprene repeat unit on the ends of the polymer.

Coating formulations were mixed by weighing all components into a jar, heating to about 100° C. and mixing manually. Coatings, heated if necessary to reduce viscosity, were drawn on steel (QD4 12) or aluminum (A412) Q-Panels using a #22 or #52 wire rod. They were cured by exposure to 1 medium pressure mercury lamp at various line speeds, usually 30 feet per minute (fpm). Samples were usually given a postbake of 10 minutes at either 120° C. or 80° C. after irradiation to complete the cure.

The cycloaliphatic epoxy resin selected for evaluation was CYRACURE UVR-6110. 20 percent weight of Polymer M could be mixed into hot UVR-6110 but the blend phase separated upon cooling to room temperature. UVR-6110 and RAPI-CURE CHVE, cyclohexane dimethanol divinyl ether (CHVE) from ISP, Inc., were blended at 80/20, 60/40, 40/60 and 20/80 ratios by weight. They formed clear, compatible blends. Polymer M was then added at 20, 40, 60 and 80 percent by weight to each of these UVR-6110/CHVE blends. Table III shows which blends were phase stable at room temperature and gives their viscosities. The results show that adding as little as 20 percent weight CHVE to UVR-6110 gives enough improvement in compatibility that phase stable blends with Polymer M can be made. In UVR-6110/CHVE blends containing higher fractions of CHVE, the viscosity is lower and so higher concentrations of Polymer M can be incorporated before viscosity becomes too high to coat easily. The results also show that increasing the temperature is effective in reducing the viscosity, making it possible to coat the higher polymer content blends at elevated temperatures.

TABLE III

Viscosity of EKP-204 in UVR-6110/CHVE Blends

| Resin Ratio | | 1 | 2 | 3 | 4 | 5 | 6 |
|---|---|---|---|---|---|---|---|
| UVR-6110 | | 100 | 80 | 60 | 40 | 20 | |
| CHVE | | | 20 | 40 | 60 | 80 | 100 |
| % w Polymer M in Resin | Temp, °C. | | | Brookfield Viscosity, centipoise | | | |
| 0 | 25 | 400 | 160 | 70 | 30 | 12 | 5 |
| 20 | 25 | a) | 675 | 415 | 160 | 80 | 35 |
| 20 | 35 | | 350 | 215 | 80 | 40 | 25 |
| 20 | 55 | | 130 | 80 | 30 | 15 | 9 |
| 40 | 25 | a) | 15000 | 3500 | 1650 | 735 | 425 |
| 40 | 35 | | 8500 | 1620 | 750 | 400 | 245 |
| 40 | 55 | | 870 | 450 | 270 | 140 | 95 |
| 60 | 25 | a) | | | | 8000 | 4500 |
| 60 | 35 | | | | 6000 | 3500 | 2140 |
| 60 | 55 | | | | 1420 | 870 | 600 |
| 80 | 35 | a) | | | | 51000 | 30000 |
| 80 | 55 | | | | 11000 | 7150 | 5500 | a) Blends were mixed manually at about 100° C. Blends of Polymer M with UVR-6110 were incompatible at 25° C. and phase separated.

The cationic photoinitiator, CYRACURE UVI-6974, was added at 1 percent by weight to the blends in Table III. After coating several formulations onto aluminum panels, it was apparent that a wetting agent was needed in the formulation. Therefore, 0.1 percent by weight FLUORAD FC-430 was added to each blend. After adding the wetting agent and after warming the high viscosity samples, fairly nice looking coatings were made from all of the compatible blends in Table III. The coatings on aluminum were exposed to UV radiation at 30 fpm line speed. Most of the coatings were still liquid after exiting the UV machine so all samples were given a postbake for 10 minutes at 120° C.

Table IV presents the qualitative evaluation of the irradiated and post-baked coatings. The phase stable coatings at 80/20 UVR-6110/CHVE seemed cured satisfactorily but were cloudy. Clear coatings with Polymer M were obtained when the UVR-6110/CHVE blend contained at least 40 percent CHVE. Generally, coating appearance improved as the CHVE proportion in the UVR-6110/CHVE blend increased. And generally, as the fraction of Polymer M in the blend increased, cure became more difficult (probably because of poor solubility of UVI-6974 in Polymer M and CHVE).

EXAMPLE 4

The performance of Polymer M and a conventional modifier of cationic cure coatings such as TONE 0201, a polycaprolactone diol from Union Carbide, were compared. Since Polymer M could only be used in UVR-6110/CHVE blends containing at least about 40 percent weight CHVE, TONE 0201 was tested both in UVR-6110 and in a 60/40 UVR6110/CHVE blend. These are formulations 1–6 in Table V. The results show that TONE 0201 performs about the same in either formulation at the same polymer content. Therefore, comparison of Polymer M and TONE 0201 in the 60/40 UVR-6110/CHVE blend is reasonable.

The results in Table V show that TONE 0201 and Polymer M perform about the same at 10 percent by weight in the formulation. Although not shown by the data in Table V, there is a major improvement caused by addition of either polymer. After the cured, unmodified coatings of Formulations 1 or 4 on aluminum or steel sit at room temperature for several days, they begin to disbond totally. TONE 0201 or Polymer M at 10 percent by weight in the formulation both prevent this disbonding. However, both coatings with 10 percent by weight of the polymers still fall the mandrel bend test on aluminum and the wedge bend test on steel. Both formulations with 20 percent by weight polymer pass the mandrel bend test. The formulation with 20 percent by weight TONE 0201 gives better performance in the wedge bend test on steel while the formulation with 20 percent by weight Polymer M gives better adhesion and MEK resistance on aluminum.

This work shows that hydrogenated polymers are more limited than unhydrogenated polymers in that they are incompatible with cycloaliphatic epoxy resins. However, cationic cure formulations can be made with hydrogenated polymers in a blend containing at least about 20 percent by weight CHVE. In a 60/40 blend, Polymer M performed comparably to a polycaprolactone diol modifier, TONE 0201.

TABLE IV

| | Compatibility of Polymer M in UVR-6110/CHVE/UVI-6974 | | | | | | |
|---|---|---|---|---|---|---|---|
| Resin Ratio (a) | | 1 | 2 | 3 | 4 | 5 | 6 |
| UVR-6110 | | 100 | 80 | 60 | 40 | 20 | 0 |
| CHVE | | 0 | 20 | 40 | 60 | 80 | 100 |
| % wt Polymer M in resin blend | Coating Property (b, c) | 1 | 2 | 3 | 4 | 5 | 6 |
| 20 | Blend Stability | Separated | Cloudy | Clear | Clear | Clear | Clear |
| | Coating Tack | | Sl. tack | Sl. tack | Sl. tack | No tack | No tack |
| | Coating Surface | | Sl. craze (d) | Sl. craze (d) | Craze (d) | Craze (d) | Good |
| 40 | Blend Stability | Separated | Cloudy | Clear | Clear | Clear | Clear |
| | Coating Tack | | Sl. tack | Sl. tack | Sl. tack | No tack | No tack |
| | Coating Surface | | | Good | Good | Good | Good |
| 60 | Blend Stability | Separated | Separated | Separated | Cloudy | Cloudy | Clear |
| | Coating Tack | | Tacky | Tacky | Tacky | Sl. tack | Sl. tack |
| 80 | Blend Stability | Separated | Separated | Separated | Separated | Separated | Clear |
| | Coating Tack | | Uncured | Uncured | Uncured | Uncured | Uncured |

(a) All blends were mixed @ 120° C. All blends contained 1 percent by weight UVI-6974 and 0.1 percent by weight FLUORAD FC-430.
(b) Blend Stability is phase stability of blend at room temperature.
(c) Blends were coated at 120° C. onto aluminum substrates with #52 wire wound rod. Coatings were exposed to UV @ 30 fpm and postbaked 10 minutes @ 120° C. Coatings developed a strong, offensive odor after postbake.
(d) Craze is surface imperfections—small cracks.

TABLE V

| Toughening UV Cured Coatings with TONE 0201 and Polymer M | | | | | | | | |
|---|---|---|---|---|---|---|---|---|
| | 1 | 2 | 3 | 4 | 5 | 6 | 7 | 8 |
| Composition, % wt (a,b) | | | | | | | | |
| UVR-6110 | 99.6 | 89.4 | 79.4 | 59.6 | 53.6 | 47.6 | 53.6 | 47.6 |
| RAPI-CURE CHVE | | | | 39.8 | 35.8 | 31.8 | 35.8 | 31.8 |
| UVI-6974 | 0.5 | 0.5 | 0.5 | 0.5 | 0.5 | 0.5 | 0.5 | 0.5 |
| FLUORAD FC-430 | 0.1 | 0.1 | 0.1 | 0.1 | 0.1 | 0.1 | 0.1 | 0.1 |
| TONE 0201 | | 10 | 20 | | 10 | 20 | | |
| Polymer M | | | | | | | 10 | 20 |
| Properties on Aluminum | | | | | | | | |
| Thickness, mil | 1.3 | 1.2 | 1.4 | 1.3 | 1.3 | 1.1 | 1.2 | 1.2 |
| 60 Degree Gloss | 177 | 177 | 175 | 180 | 172 | 174 | 67 | 147 |
| Pencil Hardness | HB | HB | HB | HB | HB | HB | HB | HB |
| Crosshatch Adhesion | 0 | 0 | 0 | 0 | 0 | 1 | 0 | 5 |
| MEK Double Rubs | 200 | 200 | 200 | 200 | 200 | 32 | 200 | 190 |
| Mendrel Bend | Delam | Delam | Exc | Delam | Delam | Exc | Delam | Exc, White |
| Properties on Steel | | | | | | | | |
| Pencil Hardness | 3H | 2H | HB | HB | HB | HB | F | HB |
| Crosshatch Adhesion | 0 | 0 | 0 | 0 | 0 | 4 | 0 | 4 |

TABLE V-continued

Toughening UV Cured Coatings with TONE 0201 and Polymer M

| | 1 | 2 | 3 | 4 | 5 | 6 | 7 | 8 |
|---|---|---|---|---|---|---|---|---|
| Wedge Bend, mm | 75 | 75 | 72 | 75 | 75 | 19 | 75 | 75 |

(a) The formulations were mixed at 60° C. They were coated on aluminum (A412) or steel (D36) Q-panels with #22 wire rod. They were irradiated at 10 fpm and postbaked 10 minutes at 80° C.
(b) Crosshatch Adhesion Scale: 5 = No adhesion loss, 0 = >65% adhesion loss.

We claim:

1. A toughened cycloaliphatic epoxy resin composition comprising:
   (a) a curable cycloaliphatic epoxy resin,
   (b) an epoxidized low viscosity polydiene polymer which contains less than 5% by weight of a vinyl aromatic hydrocarbon wherein the polymer contains from 3.0 to 6.0 milliequivalents of epoxy per gram of polymer, and
   (c) a curing agent.

2. The toughened cycloaliphatie epoxy resin composition of claim 1 wherein the epoxidized low viscosity polydiene polymer has the structural formula $$(A\text{—}B\text{—}A_p)_n\text{—}Y_r\text{—}(A_q\text{—}B)_m$$

wherein Y is a coupling agent or coupling monomers or initiator, and wherein A and B are polymer blocks which are homopolymer blocks of conjugated diolefin monomers or copolymer blocks of conjugated diolefin monomers, the A blocks have a molecular weight of from 100 to 6,000 and the B blocks have a molecular weight of from 1000 to 15,000, n is greater than 0, r is 0 or 1, m is greater than or equal to 0, n+m ranges from 1 to 100, and p and q may be 0 or 1.

3. The composition of claim 2 wherein the conjugated diolefin in the A block is isoprene and the conjugated diolefin in the B block is butadiene.

4. The composition of claim 2 wherein the conjugated diolefin in the A block is 1,4-butadiene and the conjugated diolefin in the B block is 1,2-butadiene.

5. The composition of claim 2 wherein the curing agent is selected from the group consisting of phthalic anhydride, substituted phthalic anhydrides, hydrophthalic anhydrides, substituted hydrophthalic anhydrides, succinic anhydride, substituted succinic anhydrides, halogenated anhydrides, multifunctional carboxylic acids, and polycarboxylic acids.

6. The composition of claim 2 wherein the curing agent is a catalytic curing agent selected from the group consisting of protic acids, Lewis acids and salt-blocked versions thereof.

7. A coating composition comprising the composition of claim 2.

8. The composition of claim 2 wherein the concentration of the epoxidized polymer ranges from 1 to 50% by weight of the composition.

9. The composition of claim 2 wherein an accelerator is added and the composition is cured.

10. A structural adhesive composition comprising the composition of claim 2.

11. The composition of claim 2 wherein the epoxidized polymer is partially hydrogenated and the composition also comprises at least 20% by weight of a vinyl ether.

12. A toughened cycloaliphatic epoxy resin composition comprising:
    (a) a curable cycloaliphatic epoxy resin,
    (b) an epoxidized low viscosity polydiene polymer which contains from 5% to 50% by weight of a vinyl aromatic hydrocarbon wherein the polymer contains from 2.0 to 6.0 milliequivalents of epoxy per gram of polymer, and
    (c) a curing agent.

13. The toughened cycloaliphatic epoxy resin composition of claim 12 wherein the epoxidized low viscosity polydiene polymer has the structural formula $$(A\text{—}B\text{—}A_p)_n\text{—}Y_r\text{—}(A_q\text{—}B)_m$$

wherein Y is a coupling agent or coupling monomers or initiator, and wherein A is a block composed primarily of randomly copolymerized conjugated diene and vinyl aromatic hydrocarbon monomers, B is a polymer block which is a homopolymer block of a conjugated diolefin monomer or a copolymer block of conjugated diolefin monomers, the vinyl aromatic hydrocarbon comprises from 5 to 20% by weight of the epoxidized polymer, the A blocks have a molecular weight of from 100 to 6,000 and the B blocks have a molecular weight of from 1000 to 15,000, n is greater than 0, r is 0 or 1, m is greater than or equal to 0, n+m ranges from 1 to 100, and p and q may be 0 or 1.

14. The composition of claim 13 wherein the conjugated diolefin in the A block is isoprene and the conjugated diolefin in the B block is butadiene.

15. The composition of claim 13 wherein the conjugated diolefin in the A block is 1,4-butadiene and the conjugated diolefin in the B block is 1,2-butadiene.

16. The composition of claim 13 wherein the curing agent is selected from the group consisting of phthalic anhydride, substituted phthalic anhydrides, hydrophthalic anhydrides, substituted hydrophthalic anhydrides, succinic anhydride, substituted succinic anhydrides, halogenated anhydrides, multifunctional carboxylic acids, and polycarboxylic acids.

17. The composition of claim 13 wherein the curing agent is a catalytic curing agent selected from the group consisting of protic acids, Lewis acids and salt blocked versions thereof.

18. A coating composition comprising the composition of claim 13.

19. The composition of claim 13 wherein the concentration of the epoxidized polymer ranges from 1 to 50% by weight of the composition.

20. The composition of claim 13 wherein an accelerator is added and the composition is cured.

21. The composition of claim 20 wherein the accelerator is selected from the group consisting of amines, imidazoles, phosphines, and Lewis acid compounds.

22. A structural adhesive composition comprising the composition of claim 13.

23. The composition of claim 13 wherein the epoxidized polymer is partially hydrogenated and the composition also comprises at least 20% by weight of a vinyl ether.

24. The toughened cycloaliphatic epoxy resin composition of claim 12 wherein the epoxidized low viscosity polydiene polymer has the structural formula

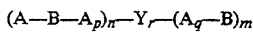

wherein Y is a coupling agent or coupling monomers or initiator, and wherein B is a block composed primarily of randomly copolymerized conjugated diene and vinyl aromatic hydrocarbon monomers, A is a polymer block which is a homopolymer block of a conjugated diolefin monomer or a copolymer block of conjugated diolefin monomers, the vinyl aromatic hydrocarbon comprises from 5 to 50% by weight of the epoxidized polymer, the A blocks have a molecular weight of from 100 to 6,000 and the B block have a molecular weight of from 1000 to 15,000, n is greater than 0, r is 0 or 1, m is greater than or equal to 0, n+m ranges from 1 to 100, and p and q may be 0 or 1.

25. The composition of claim 24 wherein the conjugated diolefin in the A block is isoprene and the conjugated diolefin in the B block is butadiene.

26. The composition of claim 24 wherein the conjugated diolefin in the A block is 1,4-butadiene and the conjugated diolefin in the B block is 1,2-butadiene.

27. The composition of claim 24 wherein the curing agent is selected from the group consisting of phthalic anhydride, substituted phthalic anhydrides, hydrophthalic anhydrides, substituted hydrophthalic anhydrides, succinic anhydride, substituted succinic anhydrides, halogenated anhydrides, multifunctional carboxylic acids, and polycarboxylic acids.

28. The composition of claim 24 wherein the curing agent is a catalytic curing agent selected from the group consisting of protic acids, Lewis acids and salt blocked versions thereof.

29. A coating composition comprising the composition of claim 24.

30. The composition of claim 24 wherein the concentration of the epoxidized polymer ranges from 1 to 50% by weight of the composition.

31. The composition of claim 24 wherein an accelerator is added and the composition is cured.

32. The composition of claim 31 wherein the accelerator is selected from the group consisting of amines, imidazoles, phosphines, and Lewis acid compounds.

33. A structural adhesive composition comprising the composition of claim 24.

34. The composition of claim 24 wherein the epoxidized polymer is partially hydrogenated and the composition also comprises at least 20% by weight of a vinyl ether.

* * * * *